(12) United States Patent
Keren

(10) Patent No.: US 10,172,302 B2
(45) Date of Patent: Jan. 8, 2019

(54) DRIP EMITTER

(71) Applicant: Netafim, Ltd., Tel Aviv (IL)

(72) Inventor: Ron Keren, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 0 days.

(21) Appl. No.: 15/022,350

(22) PCT Filed: Jul. 26, 2014

(86) PCT No.: PCT/IB2014/063453
§ 371 (c)(1),
(2) Date: Mar. 16, 2016

(87) PCT Pub. No.: WO2015/044801
PCT Pub. Date: Apr. 2, 2015

(65) Prior Publication Data
US 2016/0219803 A1     Aug. 4, 2016

Related U.S. Application Data

(60) Provisional application No. 61/882,455, filed on Sep. 25, 2013.

(51) Int. Cl.
| | | |
|---|---|---|
| *B05B 1/30* | (2006.01) | |
| *A01G 25/02* | (2006.01) | |
| *B05B 1/20* | (2006.01) | |

(52) U.S. Cl.
CPC ............ *A01G 25/023* (2013.01); *B05B 1/205* (2013.01); *B05B 1/30* (2013.01); *Y02A 40/237* (2018.01)

(58) Field of Classification Search
CPC ...... A01G 25/02; A01G 25/023; B05B 1/205; B05B 1/30; Y02A 40/237

USPC ....... 239/104, 106, 107, 553.1, 553.13, 566, 239/567, 542, 547
See application file for complete search history.

(56) References Cited

U.S. PATENT DOCUMENTS

| | | | | |
|---|---|---|---|---|
| 3,323,550 A | * | 6/1967 | Leighton, II | F15C 1/02 137/809 |
| 3,667,685 A | * | 6/1972 | Rinkewich | A01G 25/023 239/450 |
| 3,753,527 A | * | 8/1973 | Galbraith | A01G 25/023 239/11 |
| 3,870,236 A | * | 3/1975 | Sahagun-Barragan | A01G 25/02 138/42 |

(Continued)

FOREIGN PATENT DOCUMENTS

WO    WO 2011/051933     5/2011

OTHER PUBLICATIONS

International Search Report dated Jan. 16, 2015 issued in counterpart International (PCT) Application No. PCT/IB2014/063453.

(Continued)

*Primary Examiner* — Chee-Chong Lee
(74) *Attorney, Agent, or Firm* — Womble Bond Dickinson (US) LLP

(57) ABSTRACT

A drip irrigation emitter includes first and second members and a deformable membrane. The membrane is located between the members, and pins that are located on the first member are received within holes formed in the second member. End portions of the pins that project out of the holes are deformed and by that press the first and second members together and compress the membrane.

30 Claims, 5 Drawing Sheets

(56) References Cited

U.S. PATENT DOCUMENTS

| | | | |
|---|---|---|---|
| 4,060,200 A | 11/1977 | Mehoudar | |
| 5,279,462 A * | 1/1994 | Mehoudar | A01G 25/023 239/533.13 |
| 5,400,973 A * | 3/1995 | Cohen | A01G 25/023 239/533.1 |
| 5,615,838 A * | 4/1997 | Eckstein | A01G 25/023 239/533.1 |
| 6,250,571 B1 * | 6/2001 | Cohen | A01G 25/023 239/533.1 |

OTHER PUBLICATIONS

Written Opinion dated Jan. 16, 2015 issued in counterpart International (PCT) Application No. PCT/IB2014/063453.

* cited by examiner

DRIP EMITTER

RELATED APPLICATIONS

This is a 35 USC 371 U.S. National Phase of International Application No. PCT/IB2014/063453, filed 26 Jul. 2014 and published in English as WO 2015/044801A1 on 2 Apr. 2015, which claims priority to U.S. Provisional application No. 61/882,455, filed 25 Sep. 2013. The contents of the aforementioned applications are incorporated by reference in their entirety.

TECHNICAL FIELD

Embodiments of the invention relate to drip irrigation emitters and methods of forming such drip irrigation emitters.

BACKGROUND

Drip irrigation emitters may be formed from several parts, such as an outer housing formed e.g. from two members. Drip irrigation emitters typically have an inlet through which water flowing in a pipe can enter the emitter and an outlet through which water that entered the emitter can exit to the outside environment. The emitter diverts a relatively small portion of water flowing in the pipe and discharges the diverted water to irrigate plants in a neighborhood of the location of the emitter.

To control the rate at which water is discharged by the emitter, the emitter typically includes a flow restricting path that functions as a pressure reduction channel and is normally referred to as a "labyrinth channel" or "labyrinth". Through the flow restricting path water that enters the emitter must flow to reach the emitter outlet. The flow restricting path is a high resistance flow channel along which pressure of water flowing through the emitter drops relatively rapidly with distance along the path. The pressure drop is from a relatively high water pressure at the emitter inlet, to a relatively low discharge pressure, generally a gauge pressure equal to about zero, substantially at or near the emitter outlet.

Drip emitters may also include a resiliently flexible part often referred to as a membrane or diaphragm that may operate e.g. to control the rate of liquid flowing out of the emitter, so that it is substantially independent of inlet pressure for a range of pressures typically encountered in irrigation applications which may be equal to a flow rate between about 0.4 and 12 liters per hour (1/h). The membrane is usually located between the inlet and the outlet and may contain at one side water that enters the emitter inlet to pass through the labyrinth and at the other side water that already passed through the labyrinth and reached a pressure regulating chamber that in some cases is located adjacent the emitter outlet. A pressure regulating chamber located adjacent an emitter outlet, typically has a wider cross section than the labyrinth emptying into it, in order to provide improved pressure regulating performance for the emitter. The membrane in response to increase in pressure of the entering water, may flex into the pressure regulating chamber to restrict the flow of water exiting the outlet and by that act to control the rate of liquid flowing out of the emitter.

U.S. Pat. No. 6,250,571 shows a drip emitter that is adapted to be bonded to an inner surface of a water supply tube. The emitter has elongated body and cover members and a membrane that is located therebetween. The cover is integrally formed with four pins that pass through holes formed in the body member and project out of the holes to bond to the inner surface of the water supply tube. The pins are located at opposing longitudinal sides of the membrane and by the bonding to the water supply tube secure the membrane between the body and cover members.

U.S. Pat. No. 4,060,200 shows another drip emitter which is formed from first and second components with a strip interposed therebetween. The first component is formed with pins that extend through apertures in the strip into appropriate apertures in the second component. The two components brought together become press fastened to each other with the strip forming a dividing wall which contributes to defining the flow path in both components.

SUMMARY

The following embodiments and aspects thereof are described and illustrated in conjunction with systems, tools and methods which are meant to be exemplary and illustrative, not limiting in scope.

Aspects of the present invention relate to a drip irrigation emitter and to a method of forming a drip irrigation emitter and a drip irrigation pipe including the emitter.

The emitter in an embodiment may comprise first and second members and a deformable membrane. In an embodiment, the first and second members may constitute a housing of the emitter, and in some embodiments, the emitter may include additional members in and/or within the housing. The first and second members may each comprise inner and outer sides, facing respectively into and out of the emitter, and the membrane may comprise two flanks and a membrane periphery that bridges the flanks. The membrane when placed in the emitter may overly with one of its flanks at least a portion of the inner side of the first member and the inner side of the second member may overly at least a portion the other flank of the membrane while also facing towards the inner side of the first member. Preferably, a fluid flow restricting path of the emitter formed in at least one of the inner sides of the first and/or second members may be overlaid by the membrane and in contact with that portion of the membrane in an assembled state of the emitter.

The first member may comprise a plurality of pins, preferably projecting from the first member's inner side, that pass to be received within holes formed in the second member, and the holes may extend through the second member to open out at its inner and outer sides. The pins, which in some embodiments pass proximal to the membrane periphery, comprise end portions projecting out of the holes which are deformed to form deformed segments that bear against the outer side of the second member. These deformations cause and/or maintain a force that presses or fastens the first and second members towards each other while compressing the membrane therebetween.

In an embodiment, an inlet of the emitter preferably in the form of a filter may be formed through the member comprising the holes, here optionally the second member. The deformed segments of the pins thus may be located in this embodiment at a side where the inlet opens to the outside of the emitter (e.g. into a pipe where the emitter may be located during use), and consequently be visible from this side. In an aspect of the present invention, provision of the deformed segments of the pins at the inlet outer side leaves the other side of the emitter devoid of visible structures acting to fasten the two members of the emitter together (such as holes and deformed segments) which may otherwise if present at this side interfere e.g. with bonding of the emitter to a pipe.

In an embodiment, each one of the first and second members has an elongated form and the fluid flow restricting path extends longitudinally between two terminal ends. One of the terminal ends may constitute an entry into the path for liquid at a relatively high pressure and the other end may constitute an exit where the liquid empties out of the path at a relatively low pressure.

In an embodiment, at least one pin is located adjacent each one of: the first terminal end, the second terminal end and at least one location between the two terminal ends. The preferable location of pins along the path provides for one aspect of the present invention of providing fastening means, which act to fasten outer housing forming members of the emitter towards each other, at locations along the path. Preferably pins may also be placed along opposing sides (i.e. lateral sides) of the path. Locating pins at opposing sides of the path may in some embodiments, where the path e.g. extends along a longitudinal axis, be defined by locating pairs of pins along the axis with one pin of each pair being at one side and the other pin at the other side of the axis.

An aspect of the present invention also relates to forming embodiments of a membrane with neck and head segments along the longitudinal direction of the membrane. Possibly only one neck and one head segment may be envisioned, while other combinations may also be possible. A difference between a neck and head segment may be defined by a width of the neck segment measured between opposing lateral sides of its periphery being smaller than a corresponding width of the head segment.

Provision of the wider head segment may in some embodiments be for overlaying a recess formed in one of the inner sides of the emitter, which recess when overlaid by such deformable membrane may be used as a pressure regulating chamber of the emitter. Pressure regulating chambers may be required to have a wider lateral width than e.g. a lateral width of a pressure reducing paths leading into them, in order to provide for improved pressure regulating performance. Such wider dimension thus provided to a head segment may be for adjusting a membrane dimension to overly the recess of the regulating chamber.

The neck segment may be kept narrower to overly at least portions of the laterally narrower pressure reducing flow paths. The lateral width of the neck segment may be defined to sufficiently cover the flow path so as to seal the flow path from above when pressed against it. Possibly, sufficient covering of the flow path (in a lateral direction of the flow path) may be up to (and possibly slightly beyond) a raised face (or ridge or rim) that may bound and/or define the lateral sides of the flow path.

By provision of narrower (neck) segments to a membrane, pins provided on one of the emitter members may pass proximal to a lateral side of the flow path, while not penetrating the membrane, to improve sealing of the flow path that holds relatively higher pressures of liquid during use of the emitter. By provision of the neck segment, an embodiment of the emitter my have a narrower outer lateral cross sectional profile since pins may be positioned closer to the fluid flow restricting path. In some embodiments, instead of being provided with a neck segment the membrane may be formed with apertures formed penetrating therethough for allowing the passing of the pins adjacent the flow path.

An aspect of the present invention also broadly relates to a drip irrigation emitter of the type comprising an axially extending fluid flow restricting path that empties into a recess. The recess may be wider in a lateral direction away from the axis in order to provide improved pressure regulating abilities, and an embodiment of a membrane may correspond to be formed with a narrower lateral portion overlying the flow path and a wider lateral portion overlying the recess.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1A:
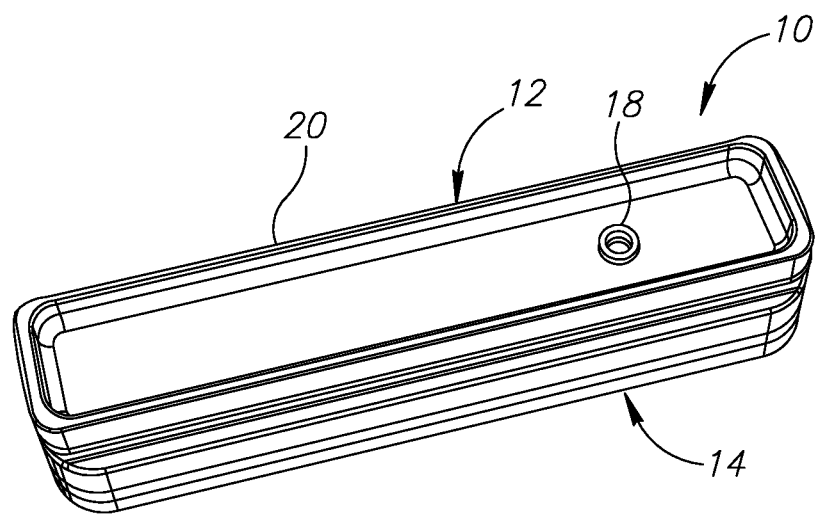
FIG. 1A schematically shows a perspective view of a drip irrigation emitter having a base at the close side and a cover at the far side, in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1B:
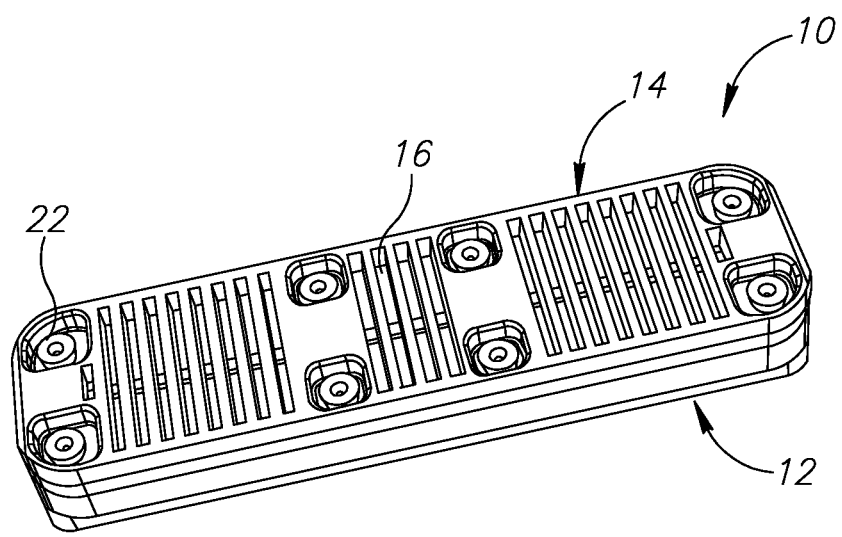
FIG. 1B schematically shows a perspective view of the drip irrigation emitter of FIG. 1 with the cover oriented at the close side and the base at the far side, in accordance with an embodiment of the present invention.

Attention is first drawn to FIGS. 1A and 1B showing a drip irrigation emitter 10, in accordance with an embodiment of the present invention. Emitter 10 has a housing that may be formed from two members, here a base 12 and a cover 14. An inlet 16 of the emitter may be formed in cover 14 and may take an optional form of a filter, and an outlet 18 of the emitter may be formed in base 12 so that liquid entering the emitter via the inlet can exit the emitter. Emitter 10 may also include a peripheral wall 20, here formed on the base, at which the emitter may attach optionally by heat bonding to an inner face of an irrigation pipe 13 (a wall of which is partially seen indicated by dashed lines in FIG. 4B). As also seen in these figures, base 12 and cover 14 of emitter 10 are secured (or fastened) to each other by pins (or pegs) 22, where here only end portions of the pins can be seen in a deformed rivet like state.

The base 12 and cover 14 of emitter 10 are optionally both of an elongated form, and each one of the base 12 and cover 14 has an inner side where it faces into the interior of the emitter and an opposite outer side where it faces out of the emitter. In FIGS. 1A and 1B the outer sides of the base and cover are visible together with portions of their peripheral sides. It should be noted that directional terms that may appear throughout the specification and claims, e.g. "longitudinal", "forward", "rear", "up", "down" etc., (and derivatives thereof) are for illustrative purposes only, and are not intended to limit the scope of the appended claims. In addition it is noted that the directional terms "down", "below" and "lower" (and derivatives thereof) define identical directions, and that the "lateral" and "longitudinal" directions when used herein may refer to directions orthogonal one to the other.

Figure 2:
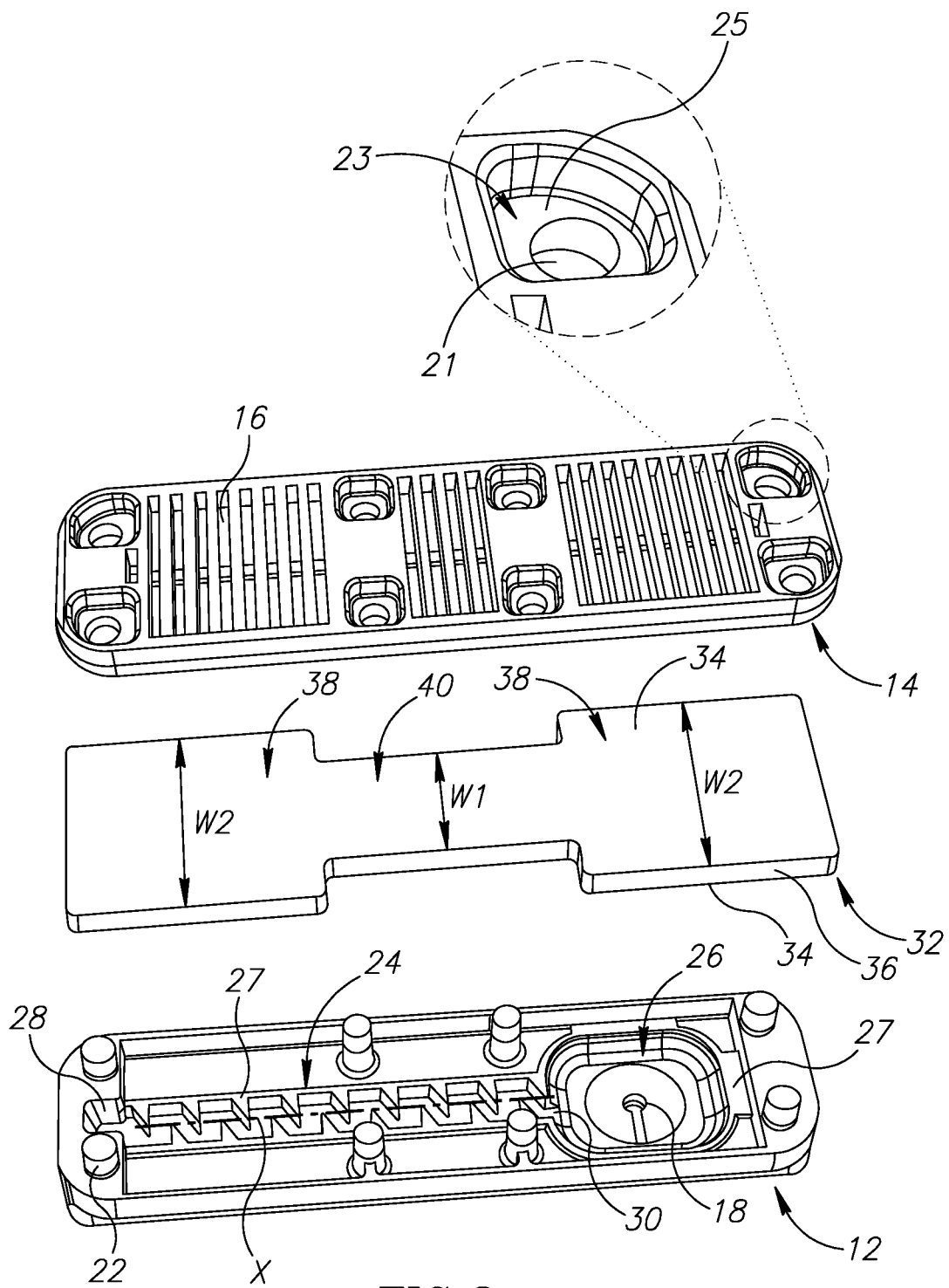
FIG. 2 schematically shows an exploded view of an embodiment of the emitter.

Attention is drawn to FIG. 2 showing an exploded view of an embodiment of emitter 10 revealing, inter alia, am optional longitudinal deformable membrane 32 of emitter 10 that may be interposed between the base and the cover. Membrane 32, which may be formed form a thermoset elastomeric material such as silicon, EPDM or the like; may have two flanks 34 (here only the one at the close side being fully visible) and a membrane periphery 36 that bridges the flanks. Optionally the flanks are planar and possibly also parallel one to the other. In an embodiment, membrane 32 along its longitudinal direction may be formed of two head segments 38 and an intermediate neck segment 40, with the head segments 38 being preferably symmetrically disposed at both sides of the neck segment 40 to simplify assembly of membrane 32 in one embodiment of the emitter 10. In other embodiments, membrane 32 may take other forms such as a possible "T-shape" (not seen) where it may include only one single head segment 38 and only one single adjacent neck segment 40.

In embodiments of membrane 32 including head and neck segments, a lateral width W1 of a neck segment measured between opposing lateral sides of the membrane periphery 36 may be smaller than a corresponding lateral width W2 of a head segment. Possibly, a ratio of W1/W2 may be between about 0.8 and 0.3 and preferably between about 0.7 and 0.5. In yet further embodiments, membrane 32 may not include a neck segment 40 and along its longitudinal direction may optionally have a substantially "constant width" between opposing lateral sides of its membrane periphery 36. An example of such an embodiment of the membrane can be seen in FIG. 5B that will be discussed below.

Base 12 as seen in this figure, may be formed with the pins 22 (here eight pins) projecting out of its inner side. The pins in the embodiments shown herein may have a substantially cylindrical body with a substantial circular profile in a cross section taken perpendicular to direction of projection. However in other embodiments (not shown) the pins may have other bodies and may have other profiles in cross section such as oval, polygonal, elliptical, rectangular, and the like. Base 12 may be formed at its inner side with a flow restricting path 24 and a recess 26 that both open out of the inner side at a face 27 that is raised above adjacent lateral portions of the inner side outside of the path and recess. Flow path 24 may possibly extend longitudinally along an axis X between two terminal ends, one constituting a beginning 28 where liquid flowing through the emitter can enter the flow path and the other constituting an end 30 where liquid can empty out of the flow path into recess 26.

Flow path 24 that functions in a formed state of an embodiment of emitter 10 (i.e. when sealingly overlaid by membrane 32) as a pressure reduction channel (i.e. labyrinth), may include a plurality of oppositely arranged teeth arrays that impede and optionally introduce turbulence into liquid flow. The liquid pressure at beginning 28 may be substantially equal to liquid pressure in the pipe in which emitter 10 is installed, and the liquid pressure at end 30 may be substantially lower than at beginning 28. Recess 26 that functions in a formed state of an embodiment of emitter 10 as a pressure regulating chamber preferably has a wider lateral width along the inner side of base 12 than flow path 24 in order to provide improved pressure regulating performance in an embodiment of emitter 10. Outlet 18 that extends through base 12 opens into recess 26 at the inner side of the base and communicates between recess and the outside of the emitter.

In the shown embodiment, three pairs of pins 22 may be located along flow path 24 with possibly one pin of each pair being located at one side and the other pin at the other side of axis X, and with both pins preferably located adjacent opposing lateral side of the flow path. A first pair of pins may be located adjacent beginning 28, a second pair of pins adjacent end 30 and a third "mid" pair of pins 22 may be at a location between the beginning and the end of flow path 24. In the shown embodiment, a fourth pair of pins 22 may be located on a side of recess 26 that is opposite to the side where flow path 24 empties into recess 26. In this fourth pair of pins, similarly, one pin of the pair may be located at one side and the other pin at the other side of an extension of axis X. It is noted that additional or less pins may be present in different embodiments of the present invention.

Cover 14 as also seen in this figure, may be formed with a plurality of cavities 23 at its outer side and a plurality of through going holes 21. As best seen in the enlarged encircled section of FIG. 2, each hole 21 extends from the inner side of the cover to open at an outward facing bearing face 25 into a respective cavity 23 at the cover's outer side. Each hole 21 may have a profile in a cross section taken perpendicular to direction of extension, which substantially corresponds to a profile of a pin with which it may be adapted to interact. In the embodiments shown herein, the holes have a substantial circular profile in cross section.

Figure 3A:
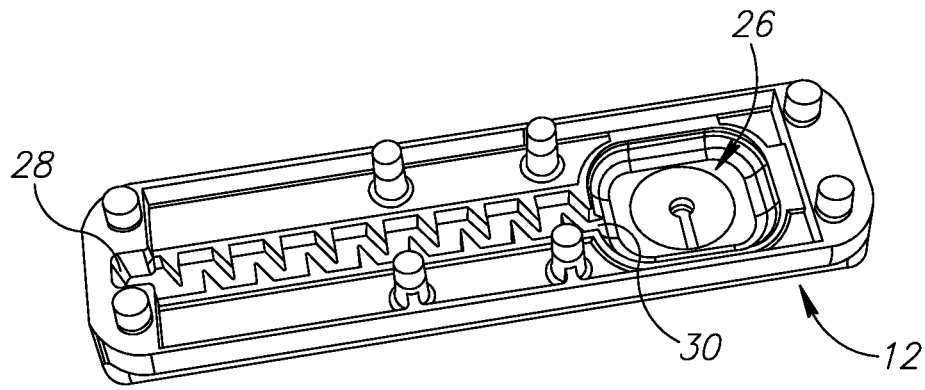
FIG. 3A schematically shows a perspective view of an inner side of the base, in accordance with an embodiment of the present invention.
Figure 3B:
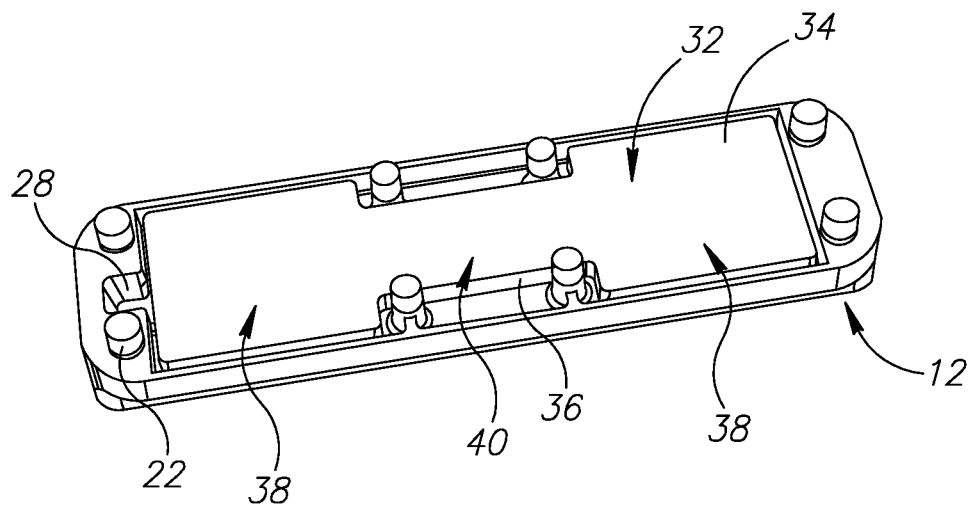
FIG. 3B schematically shows a perspective view of the inner side of the base seen in FIG. 3A being overlaid by a resilient flexible membrane of emitter, in accordance with an embodiment of the present invention.
Figure 3C:
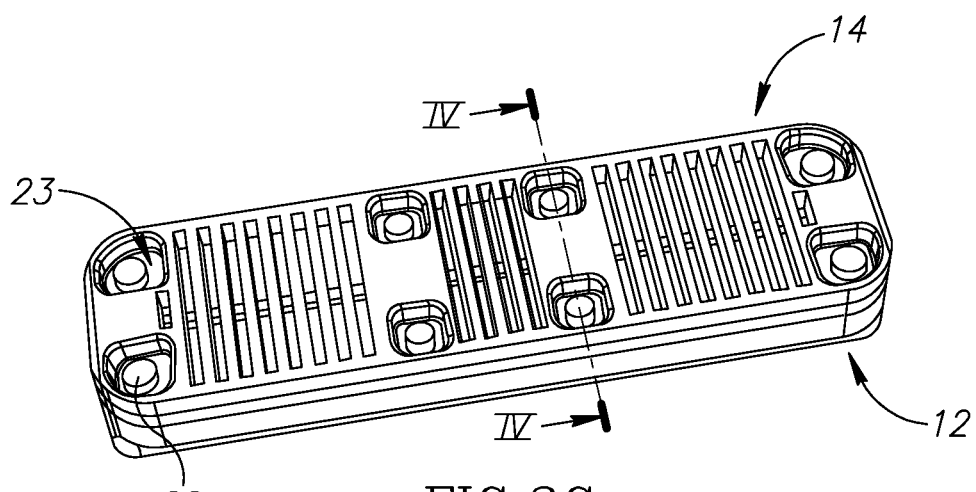
FIG. 3C schematically shows a perspective view of the base and membrane seen in FIG. 3B being overlaid by the cover, in accordance with an embodiment of the present invention.

Attention is now drawn to FIGS. 3A to 3C to show optional steps that may be taken when forming (i.e. assembling and/or producing) an emitter 10 in accordance with an embodiment of the present invention. In a first possible step seen in FIG. 3A, base 12 may be placed with its inner side revealed, and optionally facing upwards. In a second possible step seen in FIG. 3B, membrane 32 may be placed overlying the inner side of base 12 (in particular the flow path and recess in the inner side) with one of its flanks 34. Preferably in this position, the beginning 28 of the flow path is left uncovered.

Figure 5B:
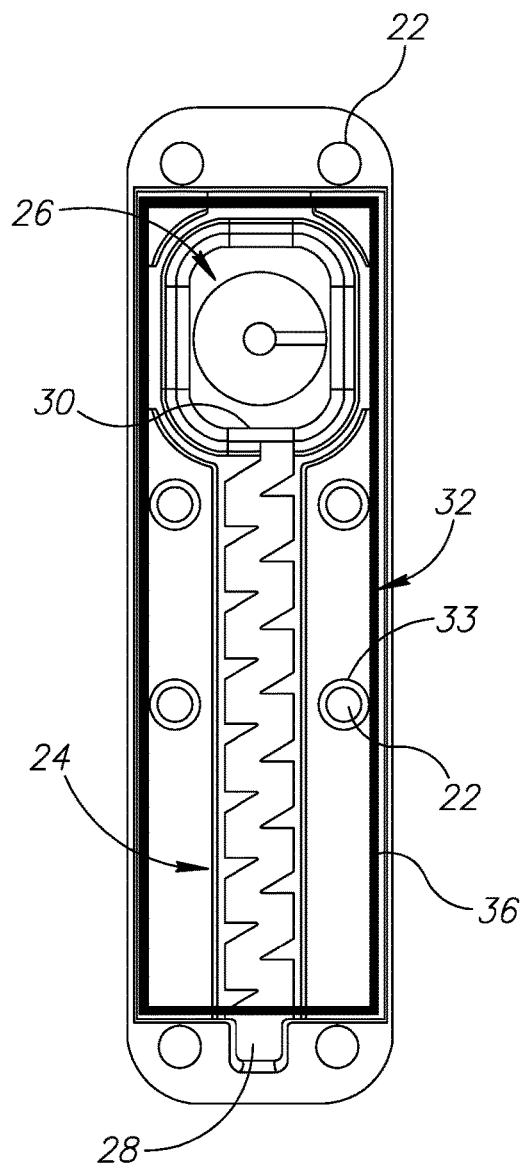
FIGS. 5A and 5B schematically show top views of embodiments of the base and membrane, with the membranes being indicated only by outer lines to reveal parts of the inner side of the base that are overlaid.
Figure 5A:
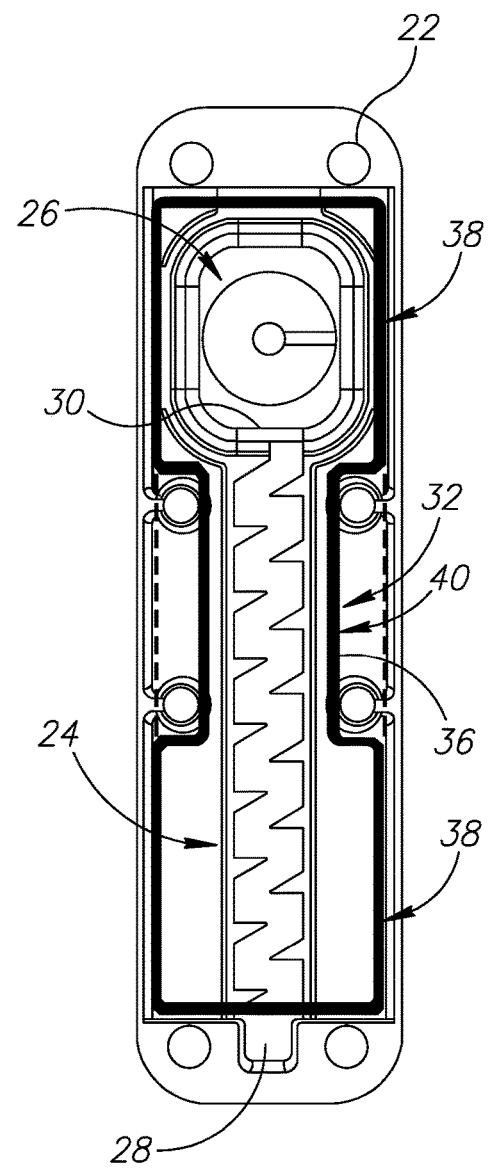

With attention additionally drawn to FIG. 5A where only the outer border lines of the membrane periphery 36 are indicated, it can be seen that in an embodiment of emitter 10 one of the head segments 38 may overly the inner side of base 12 along an area stretching between the pins 22 adjacent beginning 28 and the "mid" pins 22. Neck segment 40 may then stretch from there onwards towards the pins adjacent end 30 of the flow path and the other head segment may stretch onwards to overlie recess 26 and form together with recess 26 a pressure regulating chamber of the emitter. In embodiments, where membrane 32 may be "T-shaped", the single neck segment 40 may extend all the way from adjacent beginning 28 to end 30 of flow path 24 and the single head segment 38 may extend over recess 26.

Also in FIG. 5A by the "dashed lines" are marked imaginary lines that extend parallel to the fluid flow restricting path from opposing outer lateral sides (or extremities) of recess 26. In one embodiment of the present invention, these marked "dashed lines" may assist in defining the proximal position that the pins may have along lateral sides of flow path 24, since as seen all pins and in particular the pins adjacent and 30 and the "mid" pins 22 are located proximal to flow path 24 at locations between these imaginary lines and the fluid flow restricting path.

With attention drawn to FIG. 5B, an embodiment of emitter 10 may be seen including a so called "constant width" membrane 32, with only the outer border lines of the membrane periphery 36 being indicated. In this embodiment, membrane 32 may include apertures 33 penetrating the membrane through which the "mid" pins 22 and the pins adjacent end 30 may pass as they project above the inner side of base 12, while this time passing adjacently proximal to the membrane periphery at an inner side of the periphery 36.

With attention drawn back to FIG. 3B, a partial formed state of emitter 10 may be seen, with an embodiment of membrane 32 that includes two head segments and a neck segment. In this embodiment, membrane 32 overlies the inner side of base 12, with the pins projecting above the inner side of base 12 passing proximal to its membrane periphery 36. Also as seen, e.g. in this figure or FIG. 5A, by provision of the neck segment 40 two pairs of pins 22 (i.e. the "mid" pins and the pins adjacent end 30) may be located at proximal positions along lateral sides of flow path 24 just outside of the membrane periphery without penetrating the membrane 32.

In a third possible step seen in FIG. 3C, cover 14 may be aligned with base 12, such that each pin 22 of the base is aligned with a respective hole 21 of the cover. By then urging either the cover or base (or both) towards each other, each pin 22 may be received in its respective hole 21, by first entering the hole at the inner side of the cover and then projecting out of the hole at an end portion into a respective cavity 23 at the outer side of the cover.

Figure 4A:
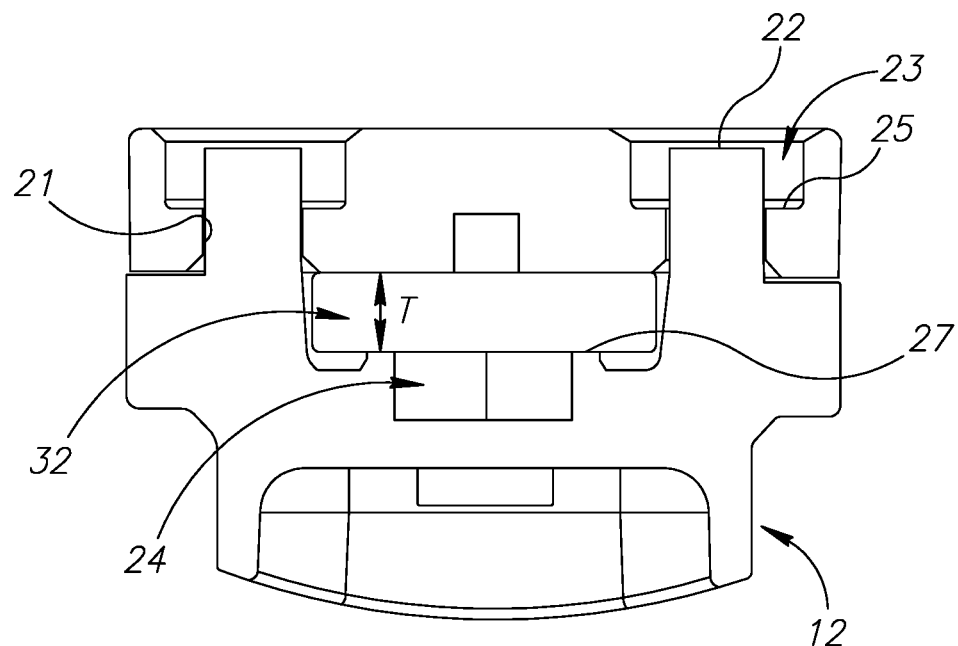
FIGS. 4A and 4B schematically show cross sections taken along plane Iv-Iv marked in FIG. 3C during different stages of formation of the emitter.

Attention is now drawn to FIG. 4A showing a cross sectional view of emitter 10 as seen after completing the step seen in FIG. 3C and along plane Iv-Iv marked in FIG. 3C. As seen in this figure, cover 14 and base 12 are aligned at this step with each pin 22 being received in its respective hole 21 and with an end portion of each pin 22 being located in a respective cavity 23.

Figure 4B:
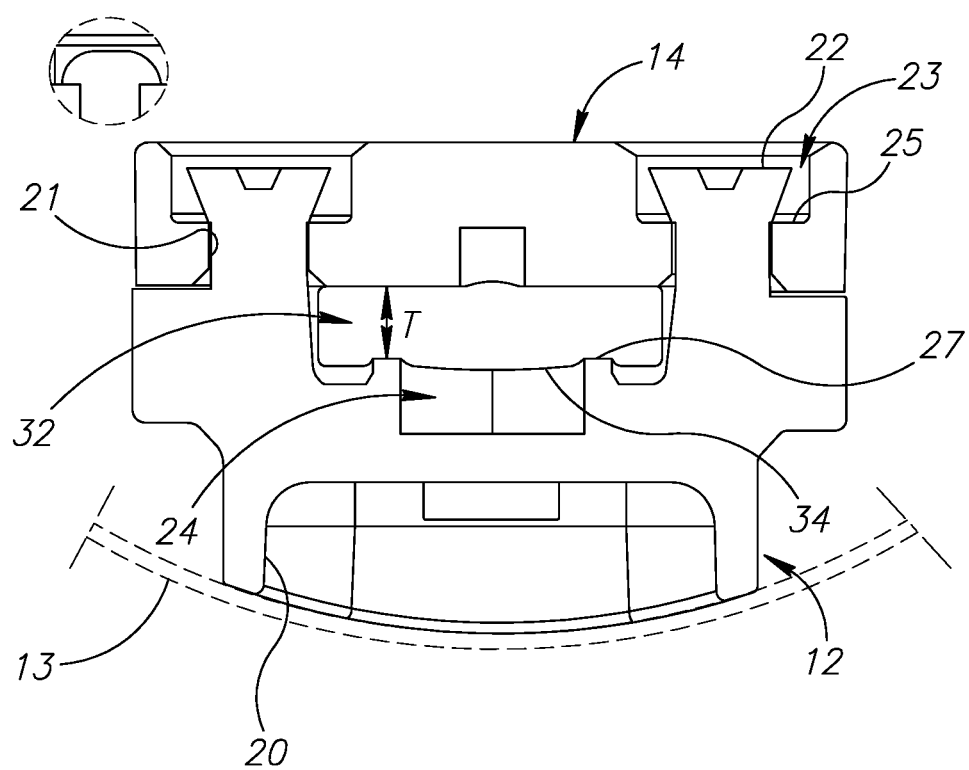

After completing this step, base 12 may be held temporarily attached to cover 14 with membrane 32 interposed therebetween by e.g. an external means (not seen) that holds these members/parts together and/or by pressure fit (interference fit) that may be formed between the pins 22 and holes 21 (i.e. dimensions of profiles, e.g. diameters, of at least some pins 22 are slightly oversized so that they may be held by friction in slightly undersized profiles, e.g. diameters, of respective holes 21). In this temporal attachment, membrane 32 may be either: loose or exposed to various levels of compression, between the base 12 and cover 14. The membrane as seen in FIG. 4B may schematically represent a compressed condition of membrane 32 when base 12 and cover 14 are temporarily attached to each other.

With attention drawn to FIG. 4B a final possible step of forming an emitter in accordance with the present invention will be discussed. In this possible final step, the pins are deformed at their end portions to assume, optionally a rivet like, deformed shape where each deformed portion of the pin bears downwards against the bearing face 25 of its respective cavity 23. These deformations formed to the pins may essentially shorten the pins and thus urge the cover and base to be pressed towards each other, and consequently compress the membrane that is interposed therebetween, while permanently fixing the attachment between the base 12 and cover 14. In an embodiment, where at the end of the preceding step (i.e. after assuming temporal attachment), the membrane 32 is already compressed between the base and cover, the step of deforming the pins may be seen as simply permanently fixing the compressed state of the membrane between the cover and base.

Deformation of the end portions of the pins 22 may be formed in different methods and manners in accordance with various embodiments of the present invention.

In one example, the pins may be punched by e.g. a hammer, punch (or the like) so that the end portions of the pins are upset (or bucked) to deform and expand relative to their original diameters. The schematic appearance of the end portions of the pins in FIGS. 1B and 4B generally illustrates "punched" end portions. In another example, ultrasonic welding, applied preferably for a brief period of possibly under about 1 second, may be used to deform the end portions of the pins. In yet another example, a hot-element applied to the pins may be used to meltingly deform their end portions. The schematic appearance of one single end portion provided in the dashed circle at the upper left side of FIG. 4B, generally illustrates such a "melted" end portion. The temperature of the hot-element may be higher by at least about 50° C. than a melting temperature of the material of the pins. In an embodiment of the present invention, where the base of emitter 10 may be formed from polyethylene, the pins which are preferably formed as an integral part of, e.g. here the base, are thus also formed from polyethylene which has a melting temperature of about 120° C. In such an embodiment, the hot-element may thus preferably have a temperature of at least about 170° C. and the heat in one example may be applied preferably for a brief period of possibly under about 1 second.

In embodiments where emitter 10 may be bonded to an irrigation pipe, a side of the emitter (here base) that attaches to the pipe may preferably be formed from the same material as the pipe to ensure bonding. In FIG. 4B such an attachment of base 12 to a pipe 13 is seen being made via peripheral wall 20. Typically, drip irrigating pipes are made of polyethylene and thus base 12, in the shown embodiments, which attaches to the pipe may preferably also be formed from polyethylene. In embodiments where the pipe may be made from a different material such as polypropylene, base 12 may accordingly also be formed form polypropylene. Cover 14, on the other hand, may be formed from any plastic material such as also polyethylene, polypropylene, PA, PBT, PET, POM (or the like)—since it may not be essential that it be formed from the same material as the pipe when not constituting the part of emitter 10 that attaches to the pipe. In addition cover 14 may not be required to be formed from the same material as the base in embodiments where base 12 and cover 14 accomplish permanent attachment by pressure formed via the pins.

In an embodiment of the present invention where the pins have a circular profile in cross section, the pins 22 may have a diameter that is smaller than about 3 millimeters and preferably between about 1 and 1.5 millimeters. In addition, in an embodiment of the present invention, a thickness T of the membrane before being compressed between the cover and base may be between about 0.5 to 1.5 millimeter, and after compression thickness T may decrease (at least at regions where membrane 32 is compressed from both sides) by about 0.02 to 0.15 millimeters.

The compressed membrane that presses against the inner sides of the cover 14 and base 12 with its flanks 34, thus may act to seal liquid flow paths formed in the emitter. As seen in FIG. 4B, flank 34 that overlies the inner side of the base 12, bears also against raised face 27 to assist in sealing the flow path 24 and recess 26. In accordance with an aspect of the present invention, an improved sealing of flow path 24 with the higher liquid pressures that it holds during use of the emitter, may be assisted at least in some embodiments by provision of the pins 22 adjacently along lateral sides of the flow path. As demonstrated in FIG. 5B, the proximal locations that the pins may be placed at opposing lateral sides of the flow path, may be assisted by the provision of the apertures 33 formed in an embodiment of the membrane. As seen in the embodiment demonstrated e.g. in FIG. 4B and e.g. FIG. 3B, the proximal locations that the pins may be placed at opposing lateral sides of the flow path may be assisted by provision of a preferable embodiment of the membrane that includes the neck segment, which avoids the need to form penetrating apertures through the membrane 32.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiments have been described to a certain degree of particularity, it should be understood that various alterations and modifications could be made without departing from the scope of the invention as hereinafter claimed.

The invention claimed is:

1. A drip irrigation emitter comprising first and second members and a deformable membrane;
   the first and second members each comprising inner and outer sides and the membrane comprising two flanks and a membrane periphery that bridges the two flanks,
   the first member comprising a plurality of projecting pins, each pin having an end portion;
   the second member comprising a plurality of through going holes extending through the second member, each hole extending from an inner side of the second member to open at an outward facing bearing face into a respective cavity at the second member's outer side,
   the membrane overlying with one flank at least a portion of the inner side of the first member and the inner side of the second member overlying at least a portion the other flank of the membrane and facing towards the inner side of the first member, wherein:
   the plurality of projecting pins pass proximal to the membrane periphery without penetrating the membrane, and through the plurality of through going holes formed in the second member; and
   the projecting pins' end portions project out of the through going holes and form deformed segments that bear against the outer side of the second member to press the first and second members towards each other and compress the membrane that is interposed therebetween.

2. The drip irrigation emitter according to claim 1, further comprising:
   a fluid flow restricting path having first and second terminal ends and being formed in the inner side of one of the first and second members, and wherein:
   at least a portion of one of the membrane flanks overlies at least a portion of the fluid flow restricting path.

3. The drip irrigation emitter according to claim 2, wherein each one of the first and second members has an elongated form and the fluid flow restricting path extends longitudinally between the first and second terminal ends.

4. The drip irrigation emitter according to claim 3, wherein:
   at least one pin of the plurality of projecting pins is located adjacent the first terminal end;
   at least one pin of the plurality of projecting pins is located adjacent the second terminal end; and
   at least one pin of the plurality of projecting pins is located between the first and second terminal ends.

5. The drip irrigation emitter according to claim 4, wherein the fluid flow restricting path extends along an axis and the at least one pin of the plurality of projecting pins is a pair of pins, wherein in each pair of pins, a first pin is at one side of the axis and a second pin is at the other side of the axis.

6. The drip irrigation emitter according claim 3, wherein the membrane comprises longitudinally extending neck and head segments, and a width of the neck segment measured between opposing lateral sides of the membrane periphery is smaller than a corresponding width of the head segment.

7. The drip irrigation emitter according to claim 6, further comprising:
   an outlet recess formed in the inner side of one of the first and second members, wherein:
   liquid flowing through the fluid flow restricting path communicates with the environment outside of the emitter via the outlet recess, and
   the neck segment overlies at least a portion of the fluid flow restricting path.

8. The drip irrigation emitter according to claim 7, wherein at least one pin of the plurality of projecting pins passes outside of the membrane adjacent a portion of the membrane periphery that extends longitudinally along the neck segment.

9. The drip irrigation emitter according to claim 2, wherein the fluid flow restricting path opens out of the inner side of either the first member or the second member, at a face that is raised above portions of that inner side adjacently outside of the fluid flow restricting path.

10. The drip irrigation emitter according to claim 1, wherein the plurality of pins pass outside of the membrane adjacent the membrane periphery.

11. The drip irrigation emitter according to claim 1, wherein deformation of the end portions of the plurality of pins is performed after receiving the pins within the through going holes.

12. The drip irrigation emitter according to claim 1, wherein at least some of the plurality of pins comprise in a cross section perpendicular to a direction of projection at least one of: a circular profile, an oval profile, a polygonal profile, an elliptical profile, a rectangular profile.

13. A drip irrigation pipe comprising:
    a drip irrigating emitter according to claim 1, wherein the emitter is bonded at an outer side of the first member to the pipe.

14. The drip irrigation emitter according claim 1, wherein the membrane comprises longitudinally extending neck and head segments, and a width of the neck segment measured between opposing lateral sides of the membrane periphery is smaller than a corresponding width of the head segment.

15. The drip irrigation emitter according to claim 14, wherein the neck and head segments are planar.

16. A drip irrigation emitter comprising first and second members and a deformable membrane;
the first and second members each comprising inner and outer sides and the membrane comprising two flanks and a membrane periphery that bridges the two flanks,
the first member comprising a plurality of projecting pins, each pin having an end portion;
the second member comprising a plurality of through going holes extending through the second member, each hole extending from an inner side of the second member to open at an outward facing bearing face into a respective cavity at the second member's outer side,
the membrane overlying with one flank at least a portion of the inner side of the first member and the inner side of the second member overlying at least a portion the other flank of the membrane and facing towards the inner side of the first member, wherein:
the plurality of projecting pins pass through the plurality of through going holes formed in the second member; and
the projecting pins' end portions project out of the through going holes and press the first and second members towards each other and compress the membrane that is interposed therebetween.

17. The drip irrigation emitter according to claim 16, wherein the plurality of projecting pins pass proximal to the membrane periphery without penetrating the membrane.

18. The drip irrigation emitter according to claim 17, wherein the projecting pins' end portions comprise deformed sections that bear against the outer side of the second member.

19. The drip irrigation emitter according to claim 16, further comprising:
a fluid flow restricting path having first and second terminal ends and being formed in the inner side of one of the first and second members, and wherein:
at least a portion of one of the membrane flanks overlies at least a portion of the fluid flow restricting path.

20. The drip irrigation emitter according to claim 19, wherein each one of the first and second members has an elongated form and the fluid flow restricting path extends longitudinally between the first and second terminal ends.

21. The drip irrigation emitter according to claim 20, wherein:
at least one pin of the plurality of projecting pins is located adjacent the first terminal end;
at least one pin of the plurality of projecting pins is located adjacent the second terminal end; and
at least one pin of the plurality of projecting pins is located between the first and second terminal ends.

22. The drip irrigation emitter according to claim 21, wherein the fluid flow restricting path extends along an axis and the at least one pin of the plurality of projecting pins is a pair of pins, wherein in each pair of pins, a first pin is at one side of the axis and a second pin is at the other side of the axis.

23. The drip irrigation emitter according claim 20, wherein the membrane comprises longitudinally extending neck and head segments, and a width of the neck segment measured between opposing lateral sides of the membrane periphery is smaller than a corresponding width of the head segment.

24. The drip irrigation emitter according to claim 23, further comprising:
an outlet recess formed in the inner side of one of the first and second members, wherein:
liquid flowing through the fluid flow restricting path communicates with the environment outside of the emitter via the outlet recess, and
the neck segment overlies at least a portion of the fluid flow restricting path.

25. The drip irrigation emitter according to claim 24, wherein at least one pin of the plurality of projecting pins passes outside of the membrane adjacent a portion of the membrane periphery that extends longitudinally along the neck segment.

26. The drip irrigation emitter according to claim 19, wherein the fluid flow restricting path opens out of the inner side of either the first member or the second member, at a face that is raised above portions of that inner side adjacently outside of the fluid flow restricting path.

27. The drip irrigation emitter according to claim 19, wherein at least some of the plurality of pins comprise in a cross section perpendicular to a direction of projection at least one of: a circular profile, an oval profile, a polygonal profile, an elliptical profile, a rectangular profile.

28. The drip irrigation emitter according claim 16, wherein the membrane comprises longitudinally extending neck and head segments, and a width of the neck segment measured between opposing lateral sides of the membrane periphery is smaller than a corresponding width of the head segment.

29. The drip irrigation emitter according to claim 28, wherein the neck and head segments are planar.

30. A drip irrigation emitter comprising first and second members and a planar, deformable membrane;
the first and second members each comprising inner and outer sides and the membrane comprising two flanks and a membrane periphery that bridges the two flanks,
the first member comprising a plurality of projecting pins, each pin having an end portion;
the second member comprising a plurality of through going holes extending through the second member, each hole opening out to the second member's inner and outer sides,
the membrane comprising a planar neck segment connected on either side to a planar head segment, a width of the planar neck segment measured between opposing lateral sides of the membrane periphery being smaller than corresponding widths of the planar head segments,
the membrane overlying with one flank at least a portion of the inner side of the first member and the inner side of the second member overlying at least a portion the other flank of the membrane and facing towards the inner side of the first member, wherein:
the plurality of projecting pins pass proximal to the membrane periphery without penetrating the membrane, and through the plurality of through going holes formed in the second member; and
the projecting pins' end portions project out of the through going holes and form deformed segments that bear against the outer side of the second member to press the first and second members towards each other and compress the membrane that is interposed therebetween.

* * * * *